United States Patent
Arro

(10) Patent No.: US 10,947,841 B2
(45) Date of Patent: Mar. 16, 2021

(54) METHOD TO COMPUTE DENSITY OF FRACTURES FROM IMAGE LOGS

(71) Applicant: Julio Roberto Arro, Spring, TX (US)

(72) Inventor: Julio Roberto Arro, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 300 days.

(21) Appl. No.: 15/883,700

(22) Filed: Jan. 30, 2018

(65) Prior Publication Data

US 2019/0234205 A1 Aug. 1, 2019

(51) Int. Cl.

| E21B 49/00 | (2006.01) |
| E21B 47/00 | (2012.01) |
| G01V 8/02 | (2006.01) |
| G01B 11/28 | (2006.01) |
| E21B 47/002 | (2012.01) |
| E21B 47/18 | (2012.01) |
| E21B 43/26 | (2006.01) |
| E21B 43/11 | (2006.01) |
| E21B 7/04 | (2006.01) |

(52) U.S. Cl.
CPC ............ *E21B 49/00* (2013.01); *E21B 47/002* (2020.05); *G01B 11/285* (2013.01); *G01V 8/02* (2013.01); *E21B 7/04* (2013.01); *E21B 43/11* (2013.01); *E21B 43/26* (2013.01); *E21B 47/18* (2013.01)

(58) Field of Classification Search
CPC ...... E21B 43/26; E21B 47/0002; E21B 49/00; E21B 43/11; E21B 47/18; E21B 7/04; G01B 11/285; G01V 8/02; G01V 2210/646; G01V 99/005
See application file for complete search history.

(56) References Cited

U.S. PATENT DOCUMENTS

| 5,659,135 A | 8/1997 | Cacas |
| 6,266,618 B1 | 7/2001 | Ye et al. |
| 6,937,021 B2 | 8/2005 | Rosthal |

(Continued)

FOREIGN PATENT DOCUMENTS

| WO | 2010115211 A1 | 10/2010 |
| WO | 2012054487 A2 | 4/2012 |

OTHER PUBLICATIONS

Narr, Wayne, "Estimating Average Fracture Spacing in Subsurface Rock", Oct. 1996, AAPG Bulletin, vol. 80, No. 10, pp. 1565-1586 (Year: 1996).*

(Continued)

*Primary Examiner* — Daniel P Stephenson
(74) *Attorney, Agent, or Firm* — Cantor Colburn LLP

(57) ABSTRACT

A method for performing a formation-related physical action includes: receiving image data of a wall of a borehole penetrating a formation, the image data having image data of fractures intersecting the wall of the borehole; and defining a volume surrounding the borehole. The method also includes determining a surface area of each fracture intersecting the volume at each defined depth in a plurality of depths and calculating a fracture density for each defined depth based on the surface area of each fracture intersecting the volume at each defined depth in a plurality of depths and a size of the volume. The method further includes performing the formation-related physical action based on the fracture density for each defined depth using apparatus configured to perform the formation-related physical action.

16 Claims, 8 Drawing Sheets

(56) References Cited

U.S. PATENT DOCUMENTS

| | | | |
|---|---|---|---|
| 7,565,277 | B2 | 7/2009 | Basquet et al. |
| 8,290,711 | B2 | 10/2012 | Barthelemy et al. |
| 8,301,427 | B2 | 10/2012 | Souche et al. |
| 8,754,362 | B2 | 6/2014 | Smaardyk et al. |
| 8,756,016 | B2 | 6/2014 | Tabanou et al. |
| 2007/0272407 | A1 | 11/2007 | Lehman et al. |
| 2010/0256964 | A1 | 10/2010 | Lee et al. |
| 2015/0267525 | A1 | 9/2015 | May et al. |
| 2016/0003039 | A1 | 1/2016 | Etchecopar et al. |
| 2017/0160421 | A1* | 6/2017 | Zhang ............... G01V 3/20 |
| 2017/0248719 | A1 | 8/2017 | Holman et al. |
| 2017/0306750 | A1* | 10/2017 | Carpenter ............ G01V 11/002 |
| 2019/0145251 | A1* | 5/2019 | Johnson ................ E21B 49/00 166/250.1 |
| 2019/0234205 | A1* | 8/2019 | Arro ...................... E21B 49/00 |

OTHER PUBLICATIONS

Berg, Charles R.; "The Effect of Fracture and Borehole Orientation on Fracture"; 2012{retrieved on Dec. 19, 2017 (Dec. 19, 2017); Retrived from the Internet; URL:http://www.resdip.com/docs/fracture orientation.pdf; 43 pages.

Cheung, et al.; "Workstation-Based Fracture Evaluation Using Borehole Images and Wireline Logs"; SPE20573; 1990; Society of Petroleum Engineers Inc.; 10 pages.

Chiles, et al.; "Estimating Fracture Density from a Linear or Areal Survey"; 2008 Geostats VIII International Geostatistics Congress; Santiago Chile; 16 pages.

Corias; "Fracture Frequency, Porosity and Permeability, Methodology for Computing"; 1999; Retrieved from the Internet; URL:http://www.corias.com/pdf/Corias%20-%20FRACTURE%20POROSITY%20AND%20PERMEABILITY.pdf; 9 pages.

Sibbit, Alan M.; "Quantifying Porosity and Estimating Permeability from Wells Logs in Fractured Basement Reservoirs"; SPE30157; Mar. 1995; Society of Petroleum Engineers; Retrieved from the Internet:https://www.researchgate.net/publication/254504286_Quantifying_Porosity_and_Estimating_Permeability_from_Well_Logs_in_Fractured_Basement_Reservoirs; 8 pages.

Notification of Transmittal of the International Search Report and the Written Opinion of the International Searching Authority, or the Declaration; PCT/US2019/014733; dated May 10, 2019; ISR: 3 pages; WO 6 pages; Total: 9 pages.

\* cited by examiner

US 10,947,841 B2

METHOD TO COMPUTE DENSITY OF FRACTURES FROM IMAGE LOGS

BACKGROUND

Geologic formations may contain reservoirs of sought-after hydrocarbons. Boreholes are typically drilled into the reservoirs where the hydrocarbons can be extracted through rock fractures in the formations. The formations though can have various fracture densities and, thus, it can be a challenge to place a borehole with a specific trajectory or to complete an existing borehole without accurate knowledge of the fracture densities. Accurate fracture density information can be used to provide efficient use of resources to drill or complete a borehole for hydrocarbon production. Hence, innovations that improve the accuracy for rock fracture density determination would be well received in the drilling and production industries.

SUMMARY

Disclosed is a method for performing a formation-related physical action. The method includes: receiving, with a processor, image data of a wall of a borehole penetrating a formation, the image data having image data of fractures intersecting the wall of the borehole; defining, with the processor, a volume surrounding the borehole; determining, with the processor, a surface area of each fracture intersecting the volume at each defined depth in a plurality of depths; calculating, with the processor, a fracture density for each defined depth based on the surface area of each fracture intersecting the volume at each defined depth in a plurality of depths and a size of the volume; and performing the formation-related physical action based on the fracture density for each defined depth using apparatus configured to perform the formation-related physical action.

Also disclosed is an apparatus for performing a formation-related physical action. The apparatus includes a non-transitory processor-readable medium comprising instructions for implementing a method. The method includes: receiving, with a processor, image data of a wall of a borehole penetrating a formation, the image data comprising image data of fractures intersecting the wall of the borehole; defining, with the processor, a volume surrounding the borehole; determining, with the processor, a surface area of each fracture intersecting the volume at each defined depth in a plurality of depths; and calculating, with the processor, a fracture density for each defined depth based on the surface area of each fracture intersecting the volume at each defined depth in a plurality of depths and a size of the volume. The apparatus also includes a processor configured to execute the instructions and apparatus configured to perform the formation-related physical action based on the calculated fracture density for each defined depth.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed are apparatuses and methods for determining a fracture density with improved accuracy over the prior art and performing a formation-related action based on the fracture density.

In the prior art, it is common to define an apparent fracture density by counting fractures, obtained from an image log, along the well in a window of length L. The apparent fracture density is defined conventionally as the quotient between the number of fractures within the window and the length of the window. The apparent fracture density determined this way, however, should be corrected for the angle between the plane of the fractures and the longitudinal axis of the well. This angle is not generally constant and causes some objections to such corrections. Small angles between the fractures and the well can be huge and generate over-corrections such that the fracture density cannot be computed accurately. The length of the counting window is fixed and when a fracture leaves the window it is no longer visible and it is no longer counted, if the angle between the fracture and the well is small, the fracture is expected to continue to be seen beyond the length of the window.

To overcome the above problems, the novel methods disclosed herein define the density of fractures as a fractured surface area per unit volume. That is, the fracture density can be computed as the ratio of the area of the fractures intercepting a three-dimensional (3D) shape, such as a sphere, to the volume of 3D shape. This novel definition is equivalent to counting fractures along the perpendicular to the fractures and defining fracture density as the number of fractures per unit length. Fracture information for computing the fracture density using the novel definition is also obtained from an image log. Apparatus for generating an image log is discussed further below.

Figure 1:
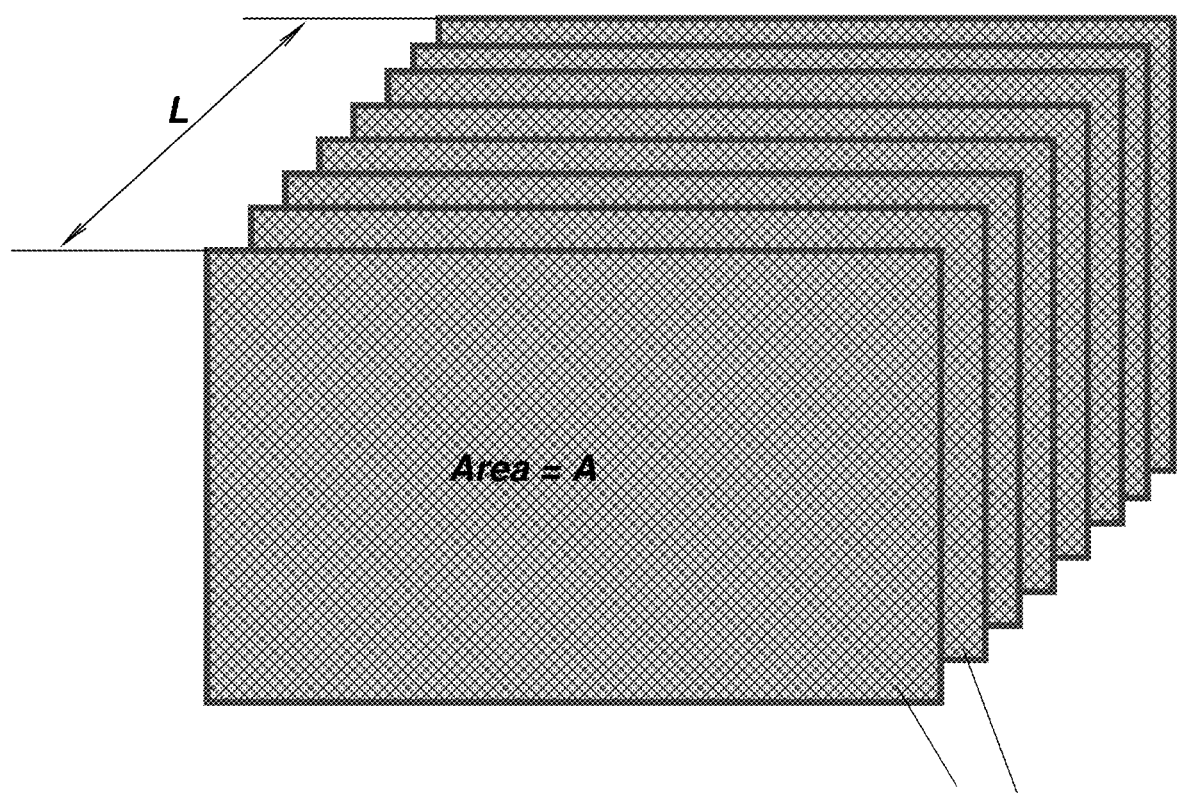
FIG. 1 depicts aspects of surface over volume in a cube.

Next, a comparison between the prior art definition of fracture density and the novel definition of fracture density is discussed. Considering a volume of rock with a cubic or prismatic shape such as that represented in the FIG. 1, the fracture density Dr is computed as the quotient of the number of fractures over their length, Equation (1).

$$D_f = \frac{N_f}{L} \qquad (1)$$

If both denominator and numerator are multiplied the area A, the value of $D_f$ is not changed, Equation (2).

$$D_f\left[\frac{1}{m}\right] = \frac{N_f \cdot A[m^2]}{L[m] \cdot A[m^2]} = \frac{A_f[m^2]}{V[m^3]} \qquad (2)$$

It can be seen that for this model the two definitions are equivalent. Any volume of arbitrary form can be approximated by cubes of different size, in each of them the equivalence between the definitions will still be valid, and is the reason why it can be inferred that the equivalence is valid for any form of the sample volume considered.

While any shape of a sample volume can be used, for teaching purposes a sphere is used. If a spherical portion of a fractured rock with a fracture density of $$10 \left[ \frac{1}{\text{Unit of lenght}} \right]$$

is considered, these fractures will have a spacing average of 0.1[Unit of length]. The fracture density for this sphere is calculated using the two definitions, number of fractures per unit length and fractured area over volume $$\frac{A_f}{V}.$$

In a window of 1[Unit of length] can enter indistinctly 10 or 11 fractures due to small differences in fracture spacing. The fracture density is 10 or 11

$$\left[ \frac{1}{\text{Unit of lenght}} \right].$$

Figure 2:
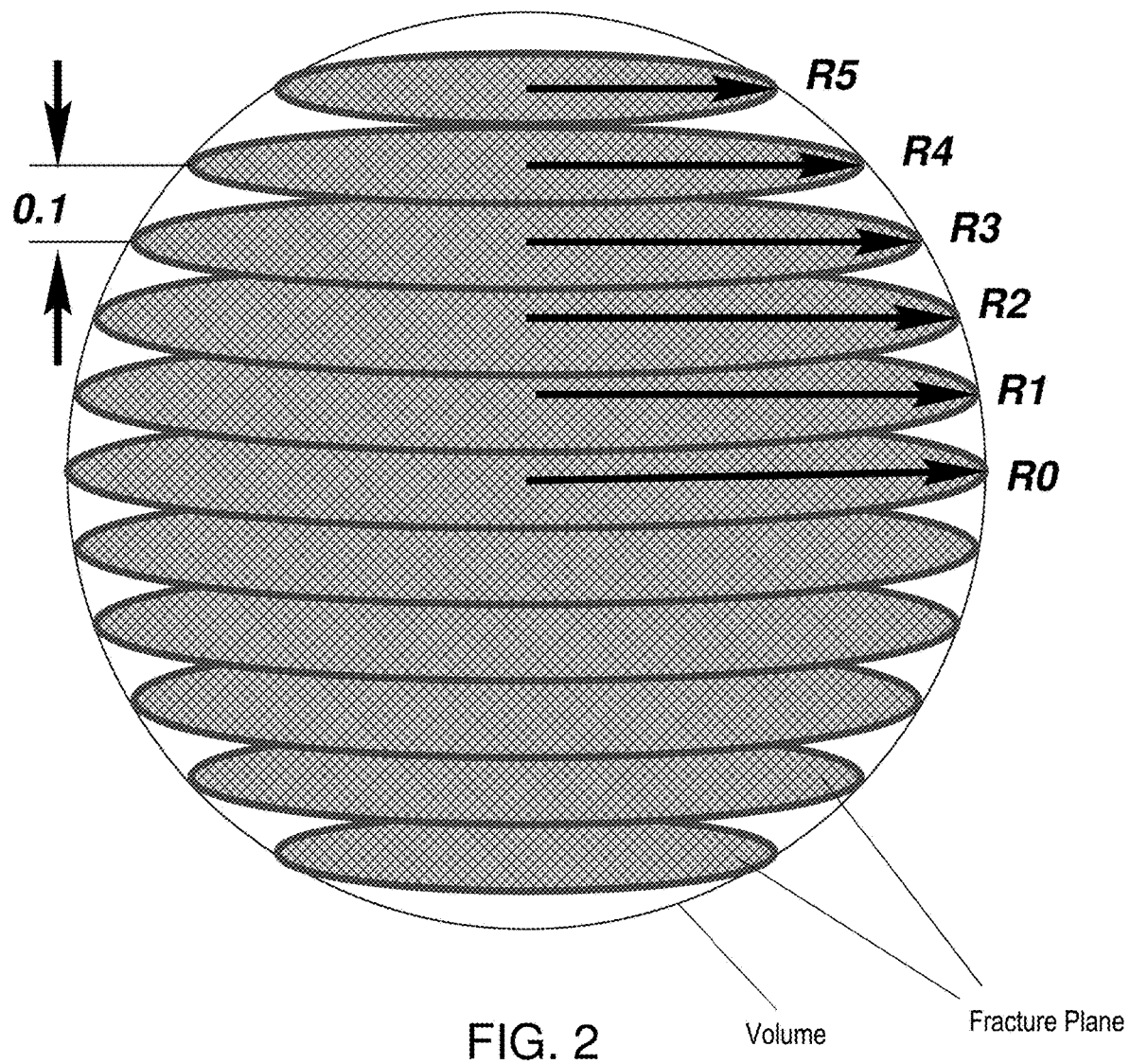
FIG. 2 depicts aspects of surface over volume of a sphere.

Calculating the density of fractures using $$\frac{A_f}{V},$$

a sphere of radius R is considered as the sample volume. As the radius of the sphere varies, fractures will appear or disappear, but gradually, not abruptly, as in a count in a window. As an example, consider a sphere of radius R=0.53 to include all fractures of the FIG. 2, the radii of each of the intersections of the fractures with the sphere have the values of the equations (3).

$R_0 = 0.53$ $R_1 = \sqrt{0.53^2 - 0.1^2} = 0.52$ $R_1 = \sqrt{0.53^2 - 0.2^2} = 0.49$ $R_1 = \sqrt{0.53^2 - 0.3^2} = 0.44$ $R_1 = \sqrt{0.53^2 - 0.4^2} = 0.35$ $R_1 = \sqrt{0.53^2 - 0.5^2} = 0.18$ (3)

The areas corresponding to these intersections are equations (4).

$A_i = \pi \cdot R_i^2$ $A_0 = 0.88$ $A_0 = 0.85$ $A_0 = 0.76$ $A_0 = 0.60$ $A_0 = 0.38$ $A_0 = 0.10$ (4)

The fractured area is determined by equation (5).

$$A_f = 2 \cdot \sum_{i=1}^{n} A_i + A_0 \tag{5}$$

The volume of a sphere of $R_0$=0.53 is determined by equation (6).

$$V_s = \frac{4}{3} \cdot \pi \cdot R_0^3 \cdot 0.624 \tag{6}$$

The fracture density obtained using the surface area over volume definition is determined by equation (7).

$$D_f = \frac{A_f}{V} = \frac{6.26}{0.624} = 10.03 \tag{7}$$

Figure 3:
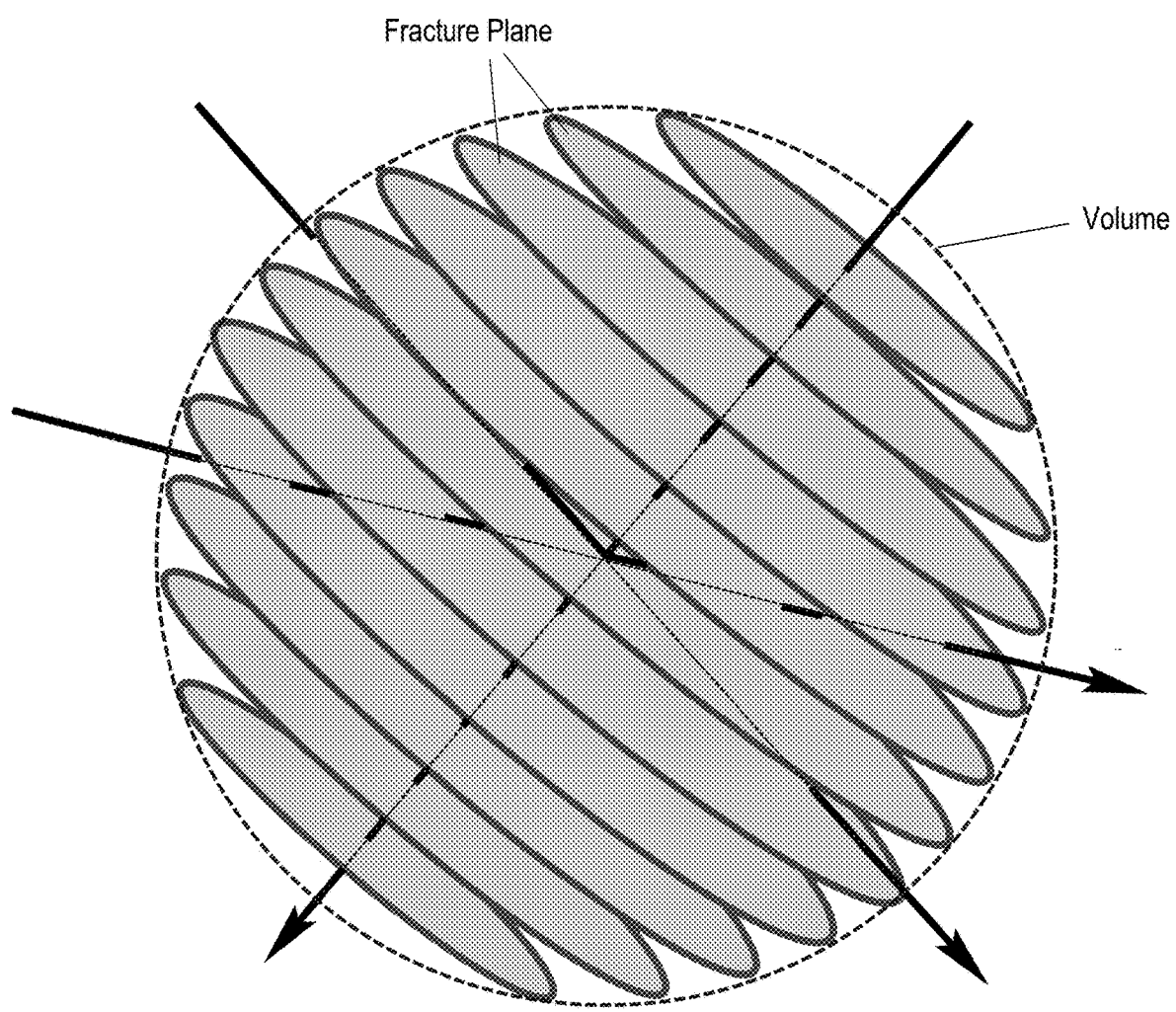
FIG. 3 depicts aspects of directions in the sphere.

Next, aspects of direction with respect to fracture density are discussed. If the definition of fractures per unit of length is considered, it can be seen that it is a definition dependent on direction. According to the direction of the well, different apparent fracture densities are obtained, which must be corrected by die angle formed by the well with the plane of the fractures. If all the fractures are parallel, the corrections are consistent, otherwise that is not true. The definition $A_f/V$, on the other hand, does not depend on the direction of the well and does not require correction, as seen in the FIG. 3.

Figure 4:
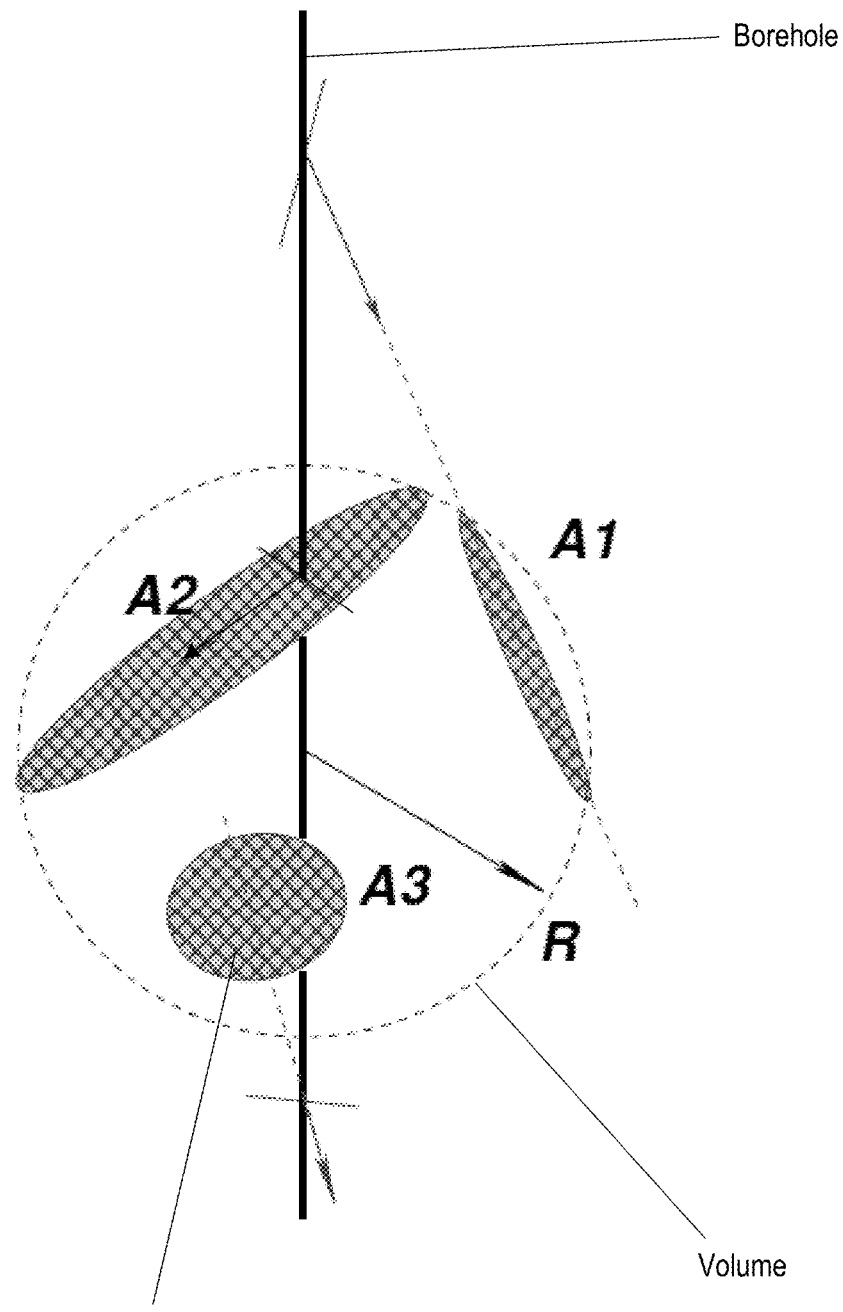
FIG. 4 depicts aspects of fractures intercepted by the sphere.

Next, calculating fracture density using the $A_f/V$ definition is discussed. Following the scheme of FIG. 4, an algorithm s disclosed to calculate the density of fractures following the $A_f/V$ definition. The algorithm uses, in one or more embodiments, a sphere of Radius R surrounding the well and moving along the well path to compute the sum of all fracture areas that intercept it, at each depth. That sum is then divided by the volume of the sphere as in equation (8) where N is the number of fractures that intercept the sphere.

$$D_f = \frac{\sum_{i=1}^{N} A_{fi}}{V} \tag{8}$$

Time algorithm considers that when interpreting well image logs, it is possible to assign an aperture to each of the found or identified fractures $E_i$. The product of the area of each intersection of fractures with the sphere by the aperture is the pore volume. The porosity of fractures $\Phi_f$ is calculated as in equation (9). The aperture size can be estimated using rock outcroppings or rock samples in non-limiting embodiments.

$$\Phi_f = \frac{\sum_{i=1}^{N} A_{fi} \cdot E_i}{V} \quad (9)$$

Figure 5:
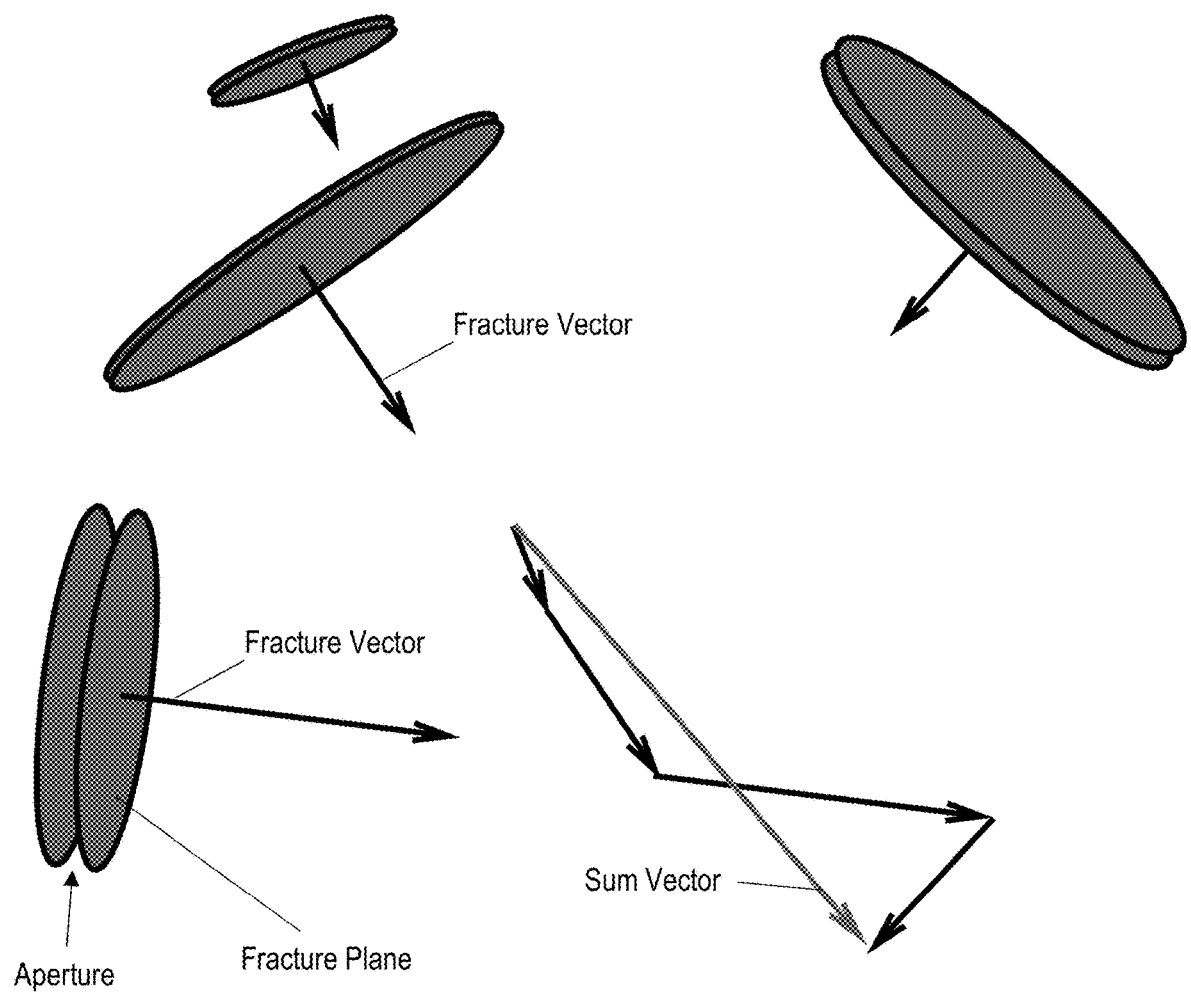
FIG. 5 depicts aspects of determining a drilling direction.

Next, an embodiment of determining a drilling direction is discussed. If the objective of directing the well path or trajectory is to traverse the greatest number of fractures while being as open as possible, one way is to define a vector, corresponding to each intersection of a fracture with the sphere. The vector is perpendicular to the plane of the intersection and has a magnitude that is the product of the intersection area by the opening of the corresponding fracture. For each depth, all of the vectors are added using vector addition. The vectors with greater amplitude are those that contribute more porosity and are the ones that are going to have more weight in the direction of the sum as illustrated in FIG. 5.

Next, the permeability of fractures is discussed. Assuming that the natural fractures are extensive compared to the diameter of the wells, the flow that is established is radial. In this case, the fluid is gaining speed as it approaches the well. To maintain the flow rate as the area decreases, a pressure drop is generated to maintain the energy constant. In addition, there are pressure differences due to changes in height due to gravitational effects and there is a pressure drop due to viscous effects that predominates over the other two effects.

Considering only the pressure drop due to viscous effect in the flow established between two discs of radius R with a hole of radius r in the center of one disc. With a distance H between discs, a pressure drop $\Delta P$ is established from R to r in accordance with equation (10). [INVENTOR—WHAT IS Q AND $\mu$?].

$$\Delta P = \frac{6 \cdot Q \cdot \mu}{\pi \cdot H^3} \cdot \ln\left(\frac{R}{r}\right) \quad (10)$$

In the same model for a radial flow, Darcy's law can be stated in equation (11) where k is permeability.

$$\Delta P = \frac{Q \cdot \mu}{2 \cdot \pi \cdot k \cdot H} \cdot \ln\left(\frac{R}{r}\right) \quad (11)$$

Equating equation (10) to equation (11), the permeability equivalent fracture referred to with a thickness equal to the opening of the fracture is obtained in equation (12).

$$k = \frac{H^2}{12} \quad (12)$$

Expressing the permeability in Darcy and the opening of fractures in millimeters, equation (13) is obtained.

$$k[\text{Darcy}] = \frac{10^6}{12} H^2 [\text{mm}^2] \quad (13)$$

This result coincides with that obtained with linear flow models. The permeability of the fractured rock, considering a window of depth of V|m| in which there are N fractures each with opening Hi is determined by equation (14).

$$k[\text{D}] = \frac{10^6}{12} \cdot \frac{\sum_{i=1}^{N} H_i^3}{1000 \cdot V[\text{m}]} \quad (14)$$

Figure 6:
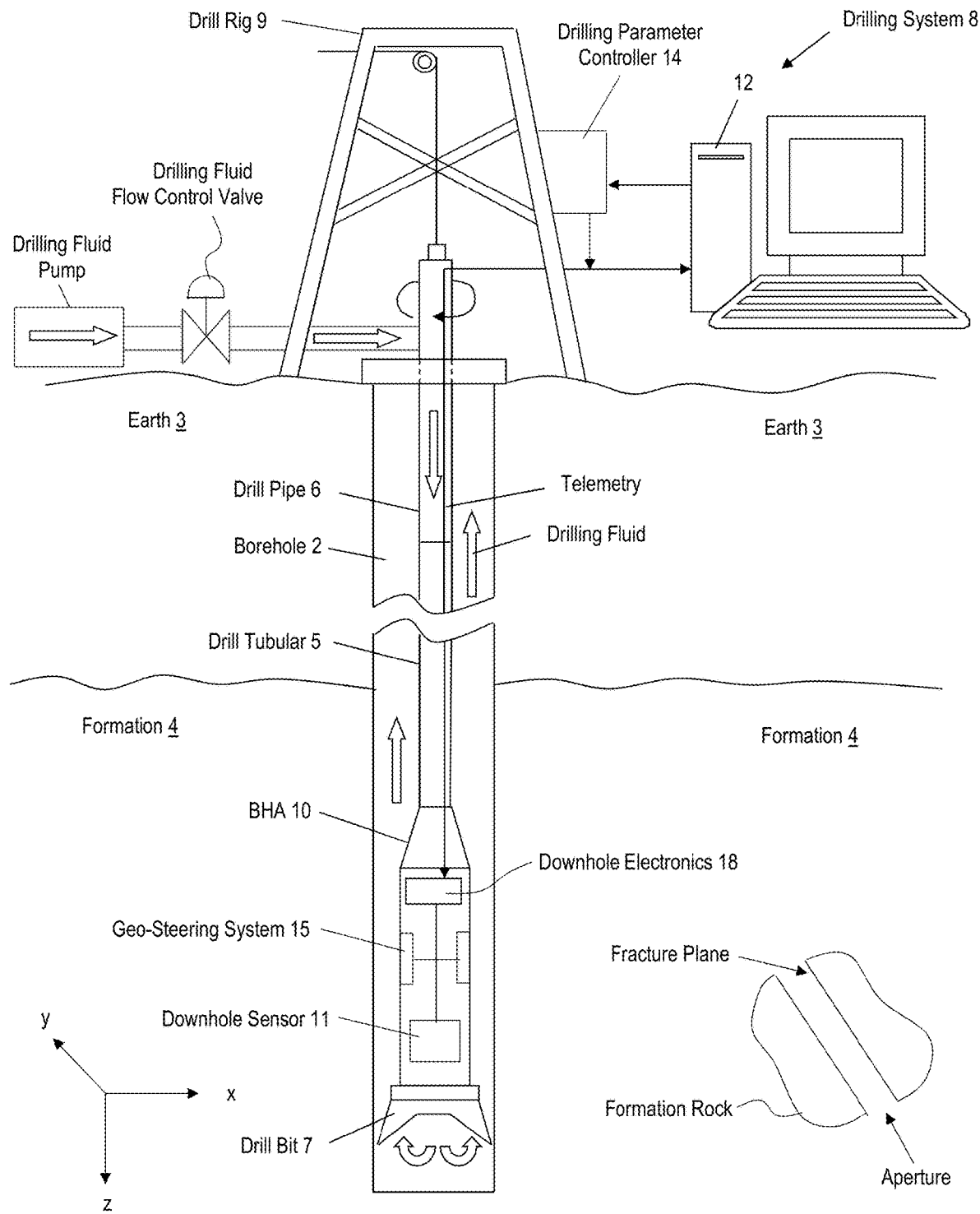
FIG. 6 illustrates a cross-sectional view of a drilling system for drilling a borehole penetrating a geologic formation.

Apparatus for implementing the methods disclosed herein and performing a formation-related action are now discussed. FIG. 6 illustrates drilling apparatus used for implementing the methods disclosed herein. FIG. 6 is a cross-sectional view of a borehole 2 (may also be referred to as a wellbore or well) penetrating the earth 3, which includes a formation 4. The formation 4 includes formation rock that has faults or fractures, some of which intersect a wall of the borehole 2.

A drilling system 8 includes a drill rig 9 that is configured to drill the borehole 2. A drill bit 7 is disposed at the distal end of a drill tubular 5 for drilling the borehole 2. The drill tubular 5 may be a drill string made up of a plurality of connected drill pipes 6. Drilling fluid or mud is pumped through the drill tubular 5 to lubricate the drill bit 7 and flush cuttings from the borehole 2. The drilling fluid is pumped by a drilling fluid pump and a flow rate of the drill fluid is controlled by a drilling fluid control valve. The drilling fluid pump and flow control valve may be controlled by a drilling parameter controller 14 to maintain a suitable pressure and flow rate to prevent the borehole 2 from collapsing. Suitable drilling fluid pressure and flow parameters may be determined by knowing the stresses of the formation rock, which can be determined from knowledge of fracture surrounding the wellbore 2. The drilling parameter controller 14 is configured to control, such as by feedback control for example, parameters used to drill the borehole. The drill tubular 5 includes a bottomhole assembly (BHA) 10. The BHA 10 includes a downhole sensor 11 configured to sense various downhole properties or parameters to provide image data that can be used to image a wall of the borehole 2. The image data includes images of fractures that intersect with the wall of the borehole 2. Non-limiting embodiments of the downhole sensor 11 include an electrical resistivity or conductivity sensor and an acoustic sensor. Different downhole sensors may be used individually or in combination. Sensor data may be transmitted to the surface by telemetry for processing such as by the computer processing system 12. In that the downhole sensor 11 may be carried by the drill tubular 5, the drill tubular 5 may be referred to as a carrier.

The BHA 10 may also include a geo-steering system 15. The geo-steering system 15 is configured to steer the drill bit 7 in order to drill the borehole 2 according to a selected trajectory, path or geometry. The trajectory, path or geometry in general is selected to optimize hydrocarbon production from the borehole 2. In one or more embodiments, the trajectory is selected to place the wellbore in a formation volume having a maximum permeability or within a selected range of the maximum permeability. Steering commands may be transmitted from the drilling parameter controller 14 to the geo-steering system 15 by the telemetry. Telemetry in one or more embodiments may include mud-pulse telemetry or wired drill pipe. Downhole electronics 18 may process data downhole and/or act as an interface with the telemetry. System operation and data processing operations may be performed by the downhole electronics 18, a surface computer processing system 12, or a combination thereof.

Figure 7:
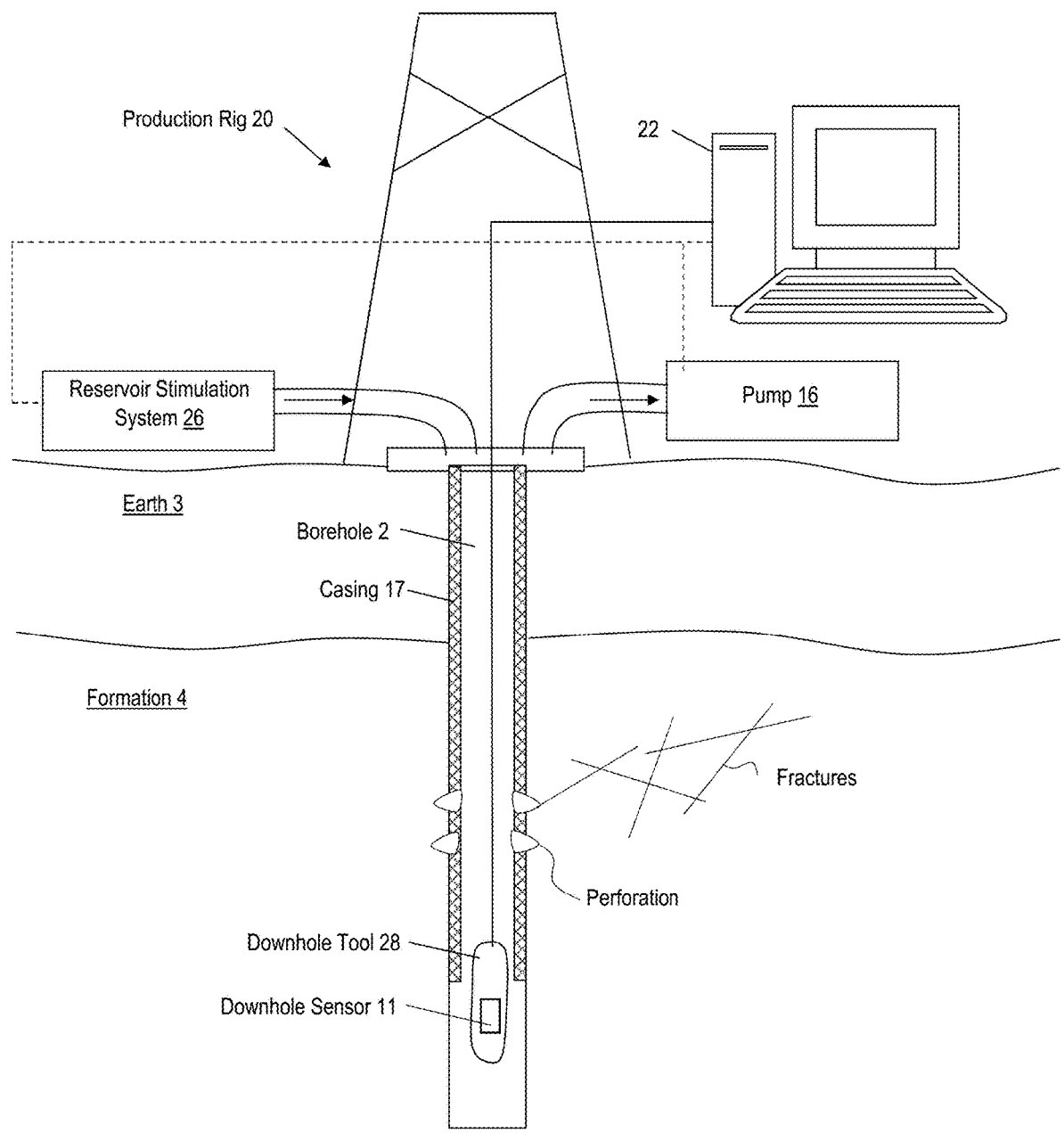
FIG. 7 illustrates a cross-sectional view of a production system for producing hydrocarbons from the formation.

In that further actions are contemplated after the borehole 2 is drilled, production equipment for implementing those actions is now discussed. FIG. 7 depicts aspects of production equipment for producing hydrocarbons from the earth formation 4 in a cross-sectional view. A production rig 20 is configured to perform actions related to the production of hydrocarbons from a reservoir in the formation 4 via the borehole 2. For example, the production 20 may include a pump 16 configured to pump hydrocarbons entering the borehole 2 to the surface at a selected flow rate based on the permeability of the formation 4. The borehole 2 may be lined by a casing 17 to prevent the borehole 2 from collapsing. The production rig 20 may include a formation or reservoir stimulation system 26 configured to stimulate the earth formation 4 to increase the flow of hydrocarbons. In one or more embodiments, the reservoir stimulation system 26 is configured to hydraulically fracture rock in the formation 4. In one or more embodiments, the formation 4 is fractured in zones or depth intervals t have low permeability or permeability that is below a selected permeability threshold value.

The production rig 20 may also be configured to image the wall of the borehole 2 and thus fractures intersecting the wall using the downhole sensor 11. The downhole sensor 11 may be included in a downhole tool 28, which may be conveyed through the borehole 2 by a carrier such as an armored wireline that also provides communications to the surface. In another embodiment, the downhole tool 28 maybe configured to perforate the casing 17 at selected locations based on permeability to provide perforations that enable communication of formation fluids with the borehole 2 for extraction. In one or more embodiments, a depth or depth interval for perforation is selected based on the permeability of the formation at that depth or depth interval being at or above a threshold permeability value.

FIG. 7 also illustrates a computer processing system 22. The computer processing system 22 is configured to implement the methods disclosed herein. Further, the computer processing system 22 may be configured to act as a controller for controlling operations of the production rig 20 to include well image logging, downhole tool operation and/or formation stimulation operation.

Figure 8:
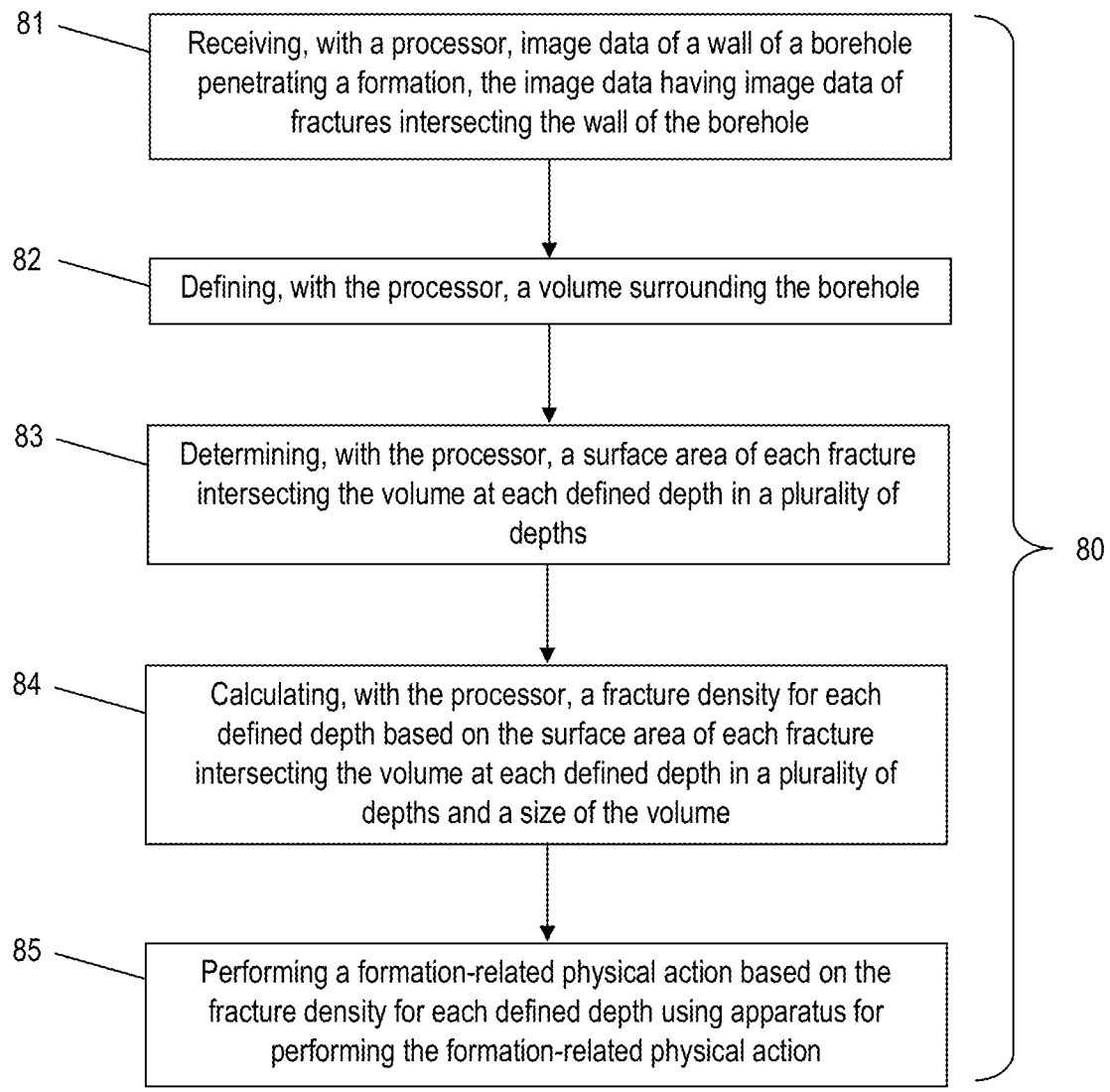
FIG. 8 is a flow chart for a method for determining a fracture density and performing a formation-related action based on the fracture density.

FIG. 8 is a flow chart for a method 80 for performing a formation-related physical action. Block 81 calls for receiving, with a processor, image data of a wall of a borehole penetrating a formation, the image data having image data of fractures intersecting the wall of the borehole. In one or more embodiments, this block may also include obtaining the image data using a downhole logging tool configured to sense the image data. Block 82 calls for defining, with the processor, a volume surrounding the borehole. The volume may be referred to as a virtual volume that is configured to analyze fractures in the image data. In one or more embodiments, the borehole traverses the volume at a center of the volume. In one or more embodiments, the volume is a sphere. In one or more embodiments, the diameter of the volume or sphere is determined by the sampling rate of the logging tool, an imaging angle, and speed of the logging tool being conveyed through the borehole such that adjacent volumes touch or overlap each other to provide continuous coverage over a range of depths in the borehole. In one or more embodiments, the diameter of the sphere in ten feet. Block 83 calls for determining, with the processor, a surface area of each fracture intersecting the volume at each defined depth in a plurality of depths. To be clear, the surface area is the surface areas of the fracture that is within the defined volume. Block 84 calls for calculating, with the processor, a fracture density for each defined depth based on the surface area of each fracture intersecting the volume at each defined depth in a plurality of depths and a size of the volume. In one or more embodiments, the fracture density is calculated for each defined depth by dividing a sum of the surface areas of the fractures intersecting the volume for each defined depth by the size of the volume.

Block 85 calls for performing the formation-related physical action based on the fracture density for each defined depth using apparatus for performing the formation-related physical action. The method 80 may also include calculating a porosity for each defined depth using the fracture density for each defined depth. In one or more embodiments, the formation-related physical action includes drilling a new borehole or further drilling an existing borehole with a trajectory that intercepts the formation where the porosity of the formation meets or exceeds a threshold value. In one or more embodiments, the method 80 may further include: defining a vector for each fracture, the vector having a direction perpendicular to a plane of each fracture and a magnitude that is a product of the fracture area of each fracture intersecting the volume by an aperture of each fracture; and summing the vectors to provide a sum vector, wherein a direction of the sum vector is used to determine the trajectory. In one or more embodiments, the formation-related physical action includes hydraulically fracturing the formation at a depth where the porosity is less than or equal to a threshold value. In one or more embodiments, the formation-related physical action includes perforating a casing at a depth where the porosity of the formation meets or exceeds a threshold value.

The method 80 may also include calculating a permeability of the formation for each defined depth. The method 80 may further include performing a formation-related action based on the calculated permeability.

Set forth belay are some embodiments of the foregoing disclosure:

Embodiment 1: A method for performing a formation-related physical action, the method comprising: receiving, with a processor, image data of a wall of a borehole penetrating a formation, the image data comprising image data of fractures intersecting the wall of the borehole; defining, with the processor, a volume surrounding the borehole; determining, with the processor, a surface area of each fracture intersecting the volume at each defined depth in a plurality of depths; calculating, with the processor, a fracture density for each defined depth based on the surface area of each fracture intersecting the volume at each defined depth in a plurality of depths and a size of the volume; and performing the formation-related physical action based on the fracture density for each defined depth using apparatus configured to perform the formation-related physical action.

Embodiment 2, The method according to any prior embodiment, further comprising calculating the fracture density by dividing a sum of the surface areas of the fractures intersecting the volume for each defined depth by the size of the volume.

Embodiment 3. The method according to any prior embodiment, wherein the volume comprises a sphere shape.

Embodiment 4. The method according to any prior embodiment, wherein a diameter of the sphere meets or exceeds ten feet.

Embodiment 5. The method according to any prior embodiment, wherein adjacent volumes meet or overlap to provide continuous coverage over a defined range of depths.

Embodiment 6. The method according to any prior embodiment, further comprising calculating a porosity for each defined depth using the fracture density for each defined depth.

Embodiment 7. The method according to any prior embodiment, wherein the formation-related physical action comprises drilling a new borehole or further drilling an existing borehole with trajectory that intercepts the formation where the porosity of the formation meets or exceeds a threshold value.

Embodiment 8. The method according to any prior embodiment, further comprising: defining a vector for each fracture, the vector having a direction perpendicular to a plane of each fracture and a magnitude comprising a product of the fracture area of each fracture intersecting the volume by an aperture of each fracture; and summing the vectors to provide a sum vector, wherein a direction of the sum vector is used to determine the trajectory.

Embodiment 9. The method according to any prior embodiment, wherein the formation-related physical action comprises hydraulically fracturing the formation at a depth where the porosity is less than or equal to a threshold value.

Embodiment 10. The method according to any prior embodiment, wherein the formation-related physical action comprises perforating a casing at a depth where the porosity of the formation meets or exceeds a threshold value.

Embodiment 11. The method according to any prior embodiment, further comprising calculating a permeability of the formation for each defined depth.

Embodiment 12. An apparatus for performing a formation-related physical action, the apparatus comprising: a non-transitory processor-readable medium comprising instructions for implementing a method comprising: receiving, with a processor, image data of a wall of a borehole penetrating a formation, the image data comprising image data of fractures intersecting the wall of the borehole; defining, with the processor, a volume surrounding the borehole; determining, with the processor, a surface area of each fracture intersecting the volume at each defined depth in a plurality of depths; calculating, with the processor, a fracture density for each defined depth based on the surface area of each fracture intersecting the volume at each defined depth in a plurality of depths and a size of the volume; a processor configured to execute the instructions; and apparatus configured to perform the formation-related physical action based on the calculated fracture density for each defined depth.

Embodiment 13. The apparatus according to any prior embodiment, wherein the method further comprises calculating the fracture density by dividing a sum of the surface areas of the fractures intersecting the volume for each defined depth by the size of the volume.

Embodiment 14. The apparatus according to any prior embodiment, wherein the method further comprises calculating a porosity for each defined depth using the fracture density for each defined depth.

Embodiment 15. The apparatus according to any prior embodiment, further comprising a drilling system configured to perform the formation-related physical action by drilling a new borehole or further drilling an existing borehole with a trajectory that intercepts the formation where the porosity of the formation meets or exceeds a threshold value.

Embodiment 16. The apparatus according to any prior embodiment, wherein the method further comprises: defining a vector for each fracture, the vector having a direction perpendicular to a plane of each fracture and a magnitude comprising a product of the fracture area of each fracture intersecting the volume by an aperture of each fracture; and summing the vectors to provide a sum vector, wherein a direction of the sum vector is used to determine the trajectory.

Embodiment 17. The apparatus according to any prior embodiment, further comprising a downhole tool configured to perform the formation-related physical action by hydraulically fracturing the formation at a depth where the porosity is less than or equal to a threshold value.

Embodiment 18. The apparatus according to any prior embodiment, further comprising a downhole tool configured to perform the formation-related physical action by perforating a casing at a depth where the porosity of the formation meets or exceeds a threshold value.

In support of the teachings herein, various analysis components may be used, including a digital and/or an analog system. For example, the surface computer processing system 12, 22, the downhole sensor 11, the drilling parameter controller 14, the geo-steering system 15, the downhole electronics 18, the reservoir stimulation system 26, and/or the downhole tool 28 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer-readable medium, including memory (ROMs, RAMS), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for performing a formation-related physical action, the method comprising:
   receiving, with a processor, image data of a wall of a borehole penetrating a formation, the image data comprising image data of fractures intersecting the wall of the borehole;
   defining, with the processor, a volume surrounding the borehole;
   determining, with the processor, a surface area of each fracture intersecting the volume at each defined depth in a plurality of depths;
   calculating, with the processor, a fracture density for each defined depth based on the surface area of each fracture intersecting the volume at each defined depth in the plurality of depths and a size of the volume by dividing a sum of the surface areas of the fractures intersecting the volume for each defined depth by the size of the volume; and
   performing the formation-related physical action based on the fracture density for each defined depth using an apparatus configured to perform the formation-related physical action.

2. The method according to claim 1, wherein the volume comprises a sphere shape.

3. The method according to claim 2, wherein a diameter of the sphere shape meets or exceeds ten feet.

4. The method according to claim 1, further comprising calculating a porosity for each defined depth using the fracture density for each defined depth.

5. The method according to claim 4, wherein the formation-related physical action comprises drilling a new borehole or further drilling an existing borehole with a trajectory that intercepts the formation where the porosity of the formation meets or exceeds a threshold value.

6. The method according to claim 5, further comprising:
   defining a vector for each fracture, the vector having a direction perpendicular to a plane of each fracture and a magnitude comprising a product of a fracture area of each fracture intersecting the volume by an aperture of each fracture; and
   summing the vector for each fracture to provide a sum vector, wherein a direction of the sum vector is used to determine the trajectory.

7. The method according to claim 4, wherein the formation-related physical action comprises hydraulically fracturing the formation at a depth where the porosity is less than or equal to a threshold value.

8. The method according to claim 4, wherein the formation-related physical action comprises perforating a casing at a depth where the porosity of the formation meets or exceeds a threshold value.

9. The method according to claim 1, further comprising calculating a permeability of the formation for each defined depth.

10. A method for performing a formation-related physical action, the method comprising:
    receiving, with a processor, image data of a wall of a borehole penetrating a formation, the image data comprising image data of fractures intersecting the wall of the borehole;
    defining, with the processor, a volume surrounding the borehole;
    determining, with the processor, a surface area of each fracture intersecting the volume at each defined depth in a plurality of depths;
    calculating, with the processor, a fracture density for each defined depth based on the surface area of each fracture intersecting the volume at each defined depth in the plurality of depths and a size of the volume; and
    performing the formation-related physical action based on the fracture density for each defined depth using an apparatus configured to perform the formation-related physical action;
    wherein adjacent volumes meet or overlap to provide continuous coverage over a defined range of depths.

11. An apparatus for performing a formation-related physical action, the apparatus comprising:
    a non-transitory processor-readable medium comprising instructions for implementing a method comprising:
      receiving, with a processor, image data of a wall of a borehole penetrating a formation, the image data comprising image data of fractures intersecting the wall of the borehole;
      defining, with the processor, a volume surrounding the borehole;
      determining, with the processor, a surface area of each fracture intersecting the volume at each defined depth in a plurality of depths;
      calculating, with the processor, a fracture density for each defined depth based on the surface area of each fracture intersecting the volume at each defined depth in the plurality of depths and a size of the volume by dividing a sum of the surface areas of the fractures intersecting the volume for each defined depth by the size of the volume;
a processor configured to execute the instructions; and
an apparatus configured to perform the formation-related physical action based on the calculated fracture density for each defined depth.

12. The apparatus according to claim 11, wherein the method further comprises calculating a porosity for each defined depth using the fracture density for each defined depth.

13. The apparatus according to claim 12, further comprising a drilling system configured to perform the formation-related physical action by drilling a new borehole or further drilling an existing borehole with a trajectory that intercepts the formation where the porosity of the formation meets or exceeds a threshold value.

14. The apparatus according to claim 13, wherein the method further comprises:

defining a vector for each fracture, the vector having a direction perpendicular to a plane of each fracture and a magnitude comprising a product of a fracture area of each fracture intersecting the volume by an aperture of each fracture; and
summing the vector for each fracture to provide a sum vector, wherein a direction of the sum vector is used to determine the trajectory.

15. The apparatus according to claim 12, further comprising a downhole tool configured to perform the formation-related physical action by hydraulically fracturing the formation at a depth where the porosity is less than or equal to a threshold value.

16. The apparatus according to claim 12, further comprising a downhole tool configured to perform the formation-related physical action by perforating a casing at a depth where the porosity of the formation meets or exceeds a threshold value.

* * * * *

UNITED STATES PATENT AND TRADEMARK OFFICE
CERTIFICATE OF CORRECTION

PATENT NO. : 10,947,841 B2
APPLICATION NO. : 15/883700
DATED : March 16, 2021
INVENTOR(S) : Julio Roberto Arro Page 1 of 1

It is certified that error appears in the above-identified patent and that said Letters Patent is hereby corrected as shown below:

In the Claims

In Column 12, Line 12, "a fracture" should read --the surface--;

In Column 14, Line 3, "a fracture" should read --the surface--.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*